(12) United States Patent
Miyazaki

(10) Patent No.: US 6,786,386 B2
(45) Date of Patent: Sep. 7, 2004

(54) SOLDERING IRON WITH HEAT PIPE

(75) Inventor: Mitsuhiko Miyazaki, Higashiosaka (JP)

(73) Assignee: Hakko Corporation, Osaka (JP)

( * ) Notice: Subject to any disclaimer, the term of this patent is extended or adjusted under 35 U.S.C. 154(b) by 0 days.

(21) Appl. No.: 10/060,342

(22) Filed: Feb. 1, 2002

(65) Prior Publication Data
US 2003/0146264 A1 Aug. 7, 2003

(51) Int. Cl.⁷ .............................. B23K 3/08; B23K 3/04; H05B 3/42
(52) U.S. Cl. ........................ 228/51; 228/53; 228/55; 219/229; 219/230; 219/241
(58) Field of Search ............................ 228/51–55, 56.1; 219/245, 229, 230, 238, 241

(56) References Cited

U.S. PATENT DOCUMENTS

| 3,580,462 | A | * | 5/1971 | Vanyi ........................ 228/51 |
| 3,769,674 | A | | 11/1973 | Droughton et al. |
| 3,770,937 | A | * | 11/1973 | Smits ........................ 219/241 |
| 3,889,096 | A | | 6/1975 | Asselman et al. |
| 4,109,131 | A | | 8/1978 | Schlüter |
| 4,284,873 | A | | 8/1981 | Schlüter |
| 4,562,337 | A | * | 12/1985 | Lawrence ................... 219/421 |
| 4,699,308 | A | | 10/1987 | Wigley et al. |
| 4,779,786 | A | * | 10/1988 | Holdway ................... 228/20.5 |
| 4,785,793 | A | * | 11/1988 | Oglesby et al. ............. 126/414 |
| 4,839,501 | A | | 6/1989 | Cowell |
| 4,847,465 | A | | 7/1989 | Toyama et al. |
| 4,948,946 | A | * | 8/1990 | Fukunaga .................... 219/230 |
| 5,007,405 | A | * | 4/1991 | Hsu ............................ 126/414 |
| 5,248,076 | A | * | 9/1993 | Eisele et al. ................. 228/54 |
| 5,329,085 | A | * | 7/1994 | Cowell et al. ............. 219/616 |
| 5,442,910 | A | | 8/1995 | Anderson |
| 5,483,040 | A | * | 1/1996 | Fortune ..................... 219/230 |
| 5,796,072 | A | * | 8/1998 | Okuno ....................... 219/229 |
| 6,142,947 | A | | 11/2000 | Tran et al. |
| 6,215,104 | B1 | * | 4/2001 | Kurpiela et al. ............. 219/238 |
| 2002/0084307 | A1 | * | 7/2002 | Ruszowski ................... 228/51 |

FOREIGN PATENT DOCUMENTS

| DE | 2329147 | A | * | 2/1974 |
| DE | 4320426 | A1 | * | 2/1995 |
| GB | 2162106 | A | * | 1/1986 |

* cited by examiner

Primary Examiner—L. Edmondson
(74) Attorney, Agent, or Firm—Smith Patent Office

(57) ABSTRACT

A soldering iron comprises a tip end; a heater portion for electrically heating the tip end of the soldering iron; a holding portion provided at the rear end of the heater portion: a heat pipe structure provided in the holding portion; a first heat pipe holder for holding a frontal portion of the heat pipe structure to which heat generated at the heater portion is transferred; a second heat pipe holder for holding a rear part of the heat pipe structure; and a grip portion placed externally around the first heat pipe holder.

19 Claims, 17 Drawing Sheets

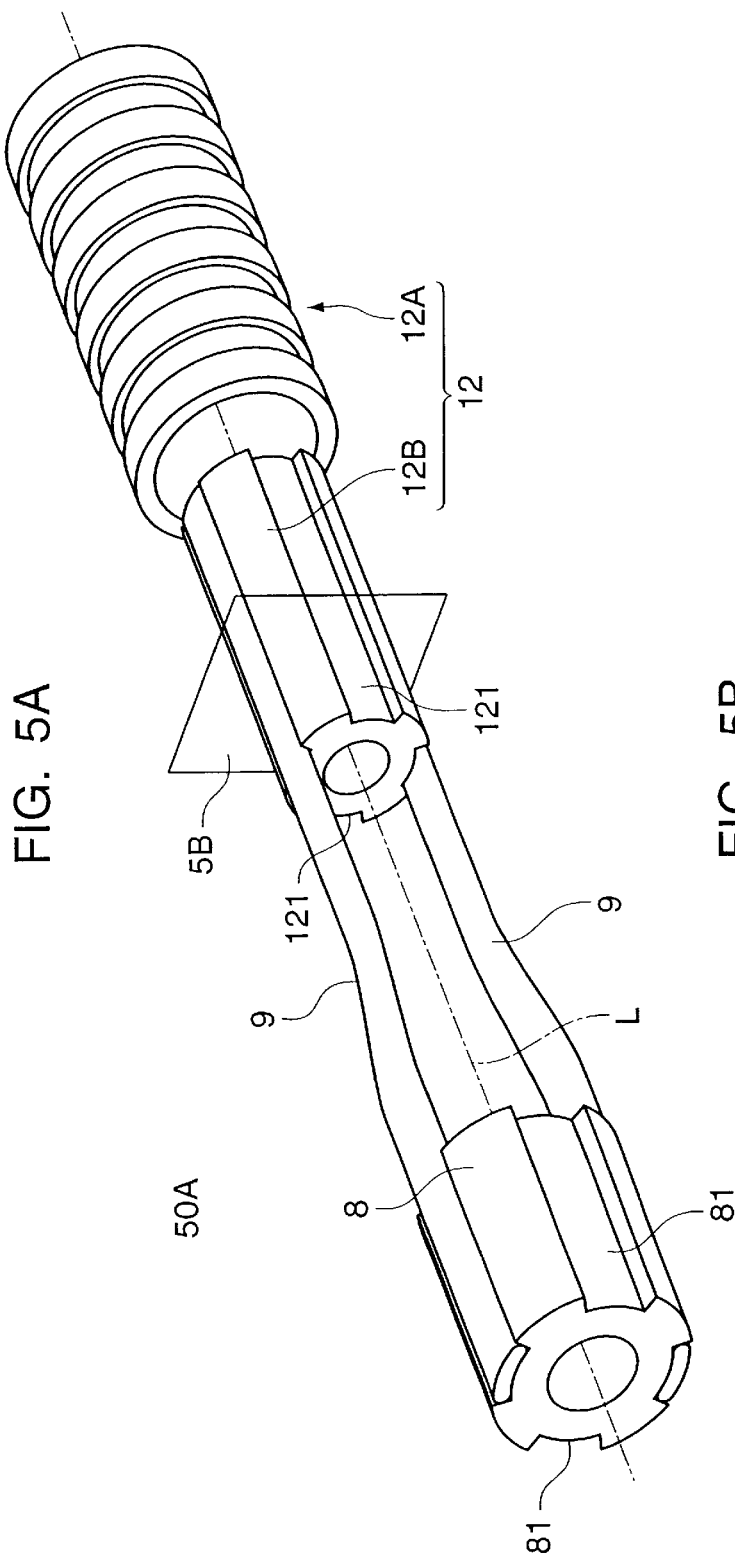
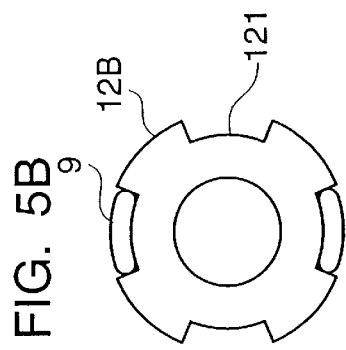

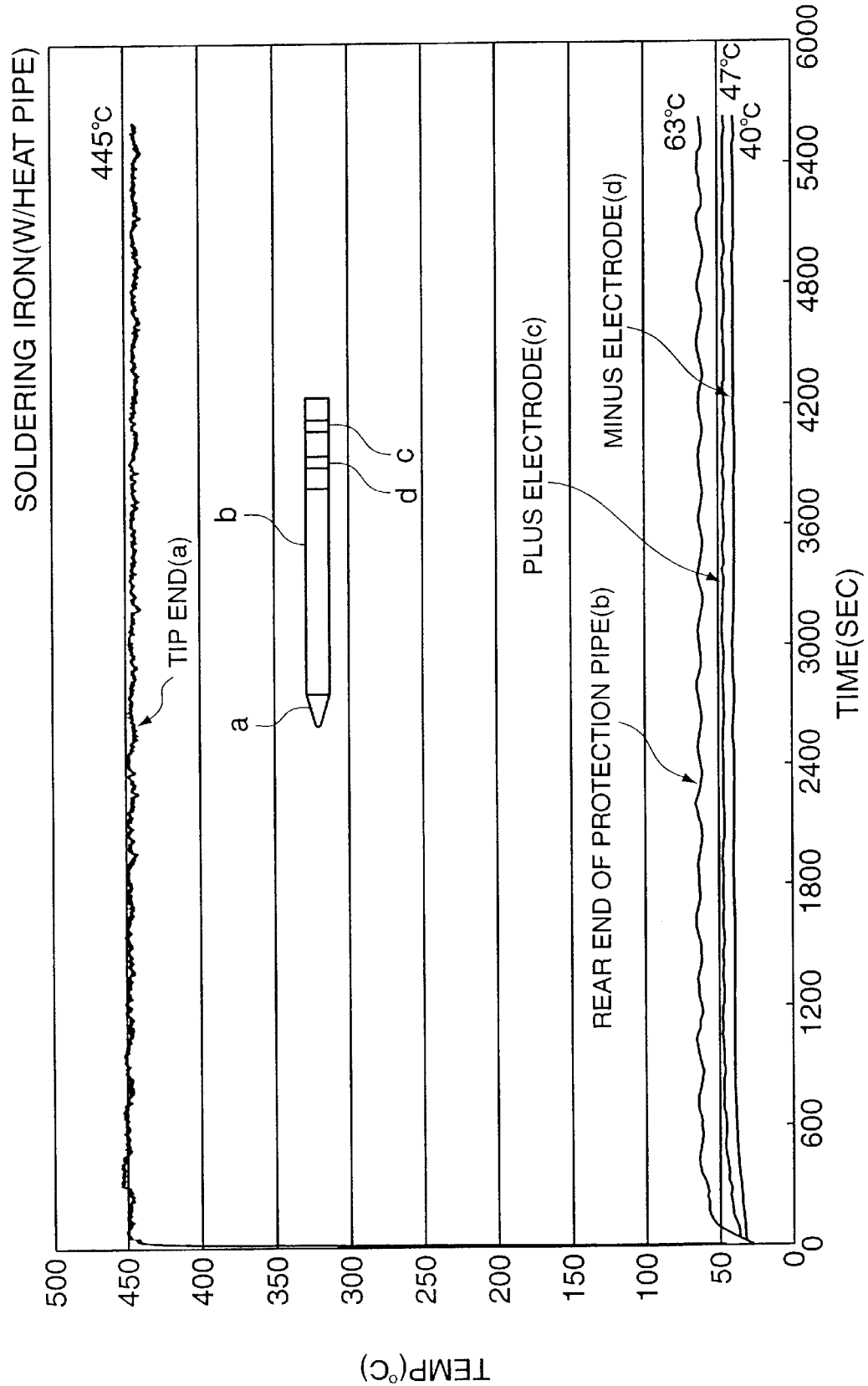

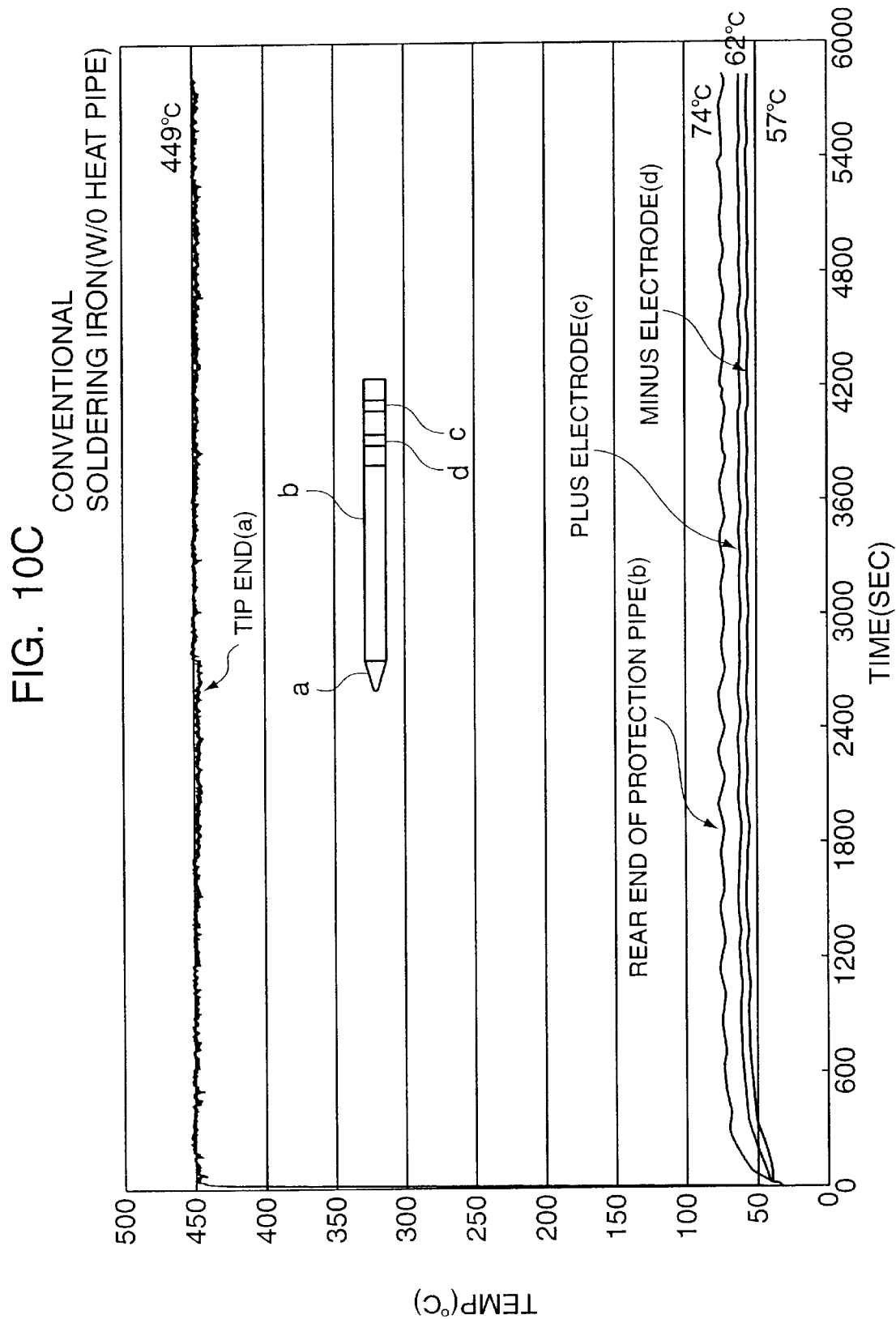

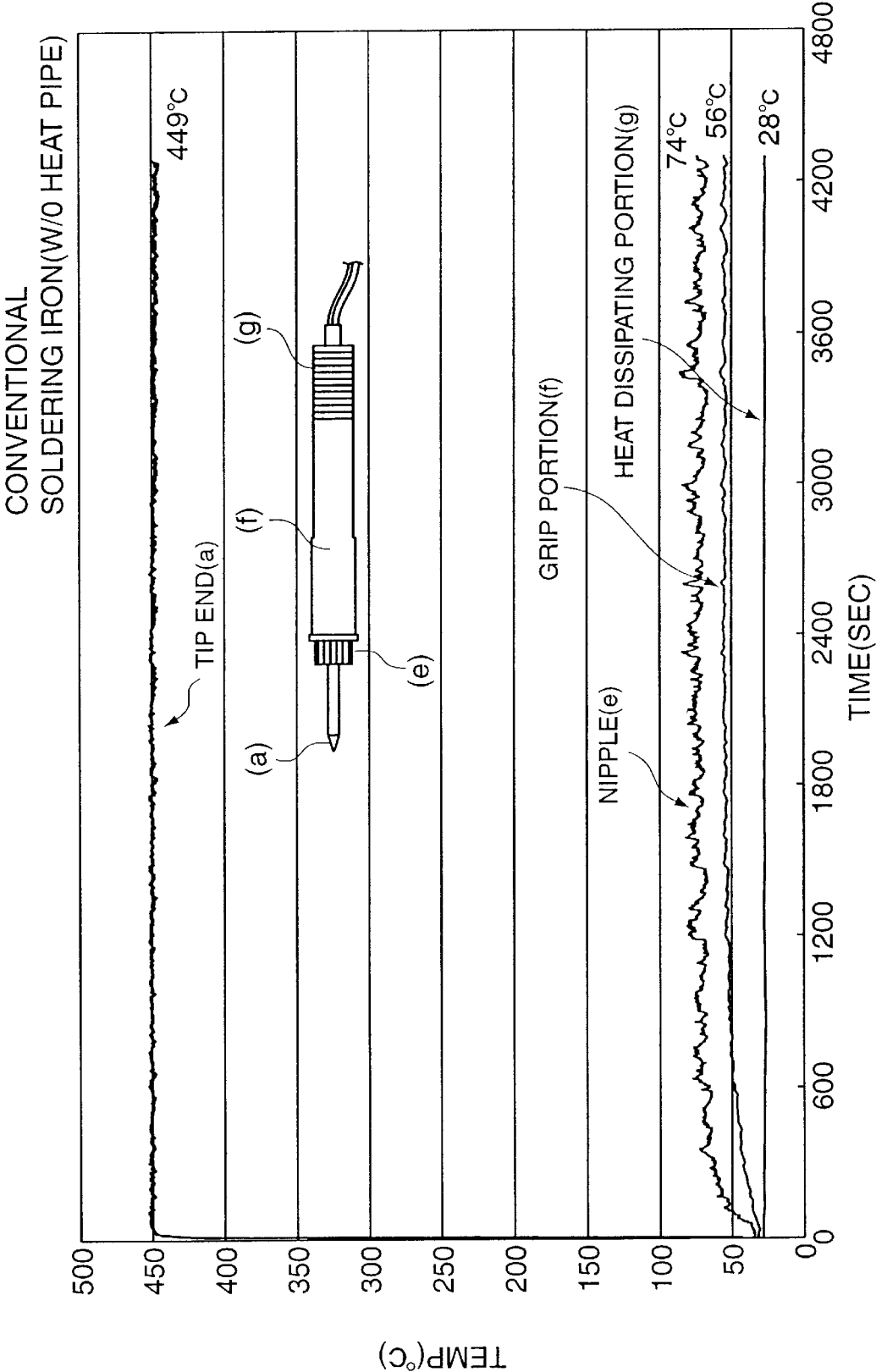

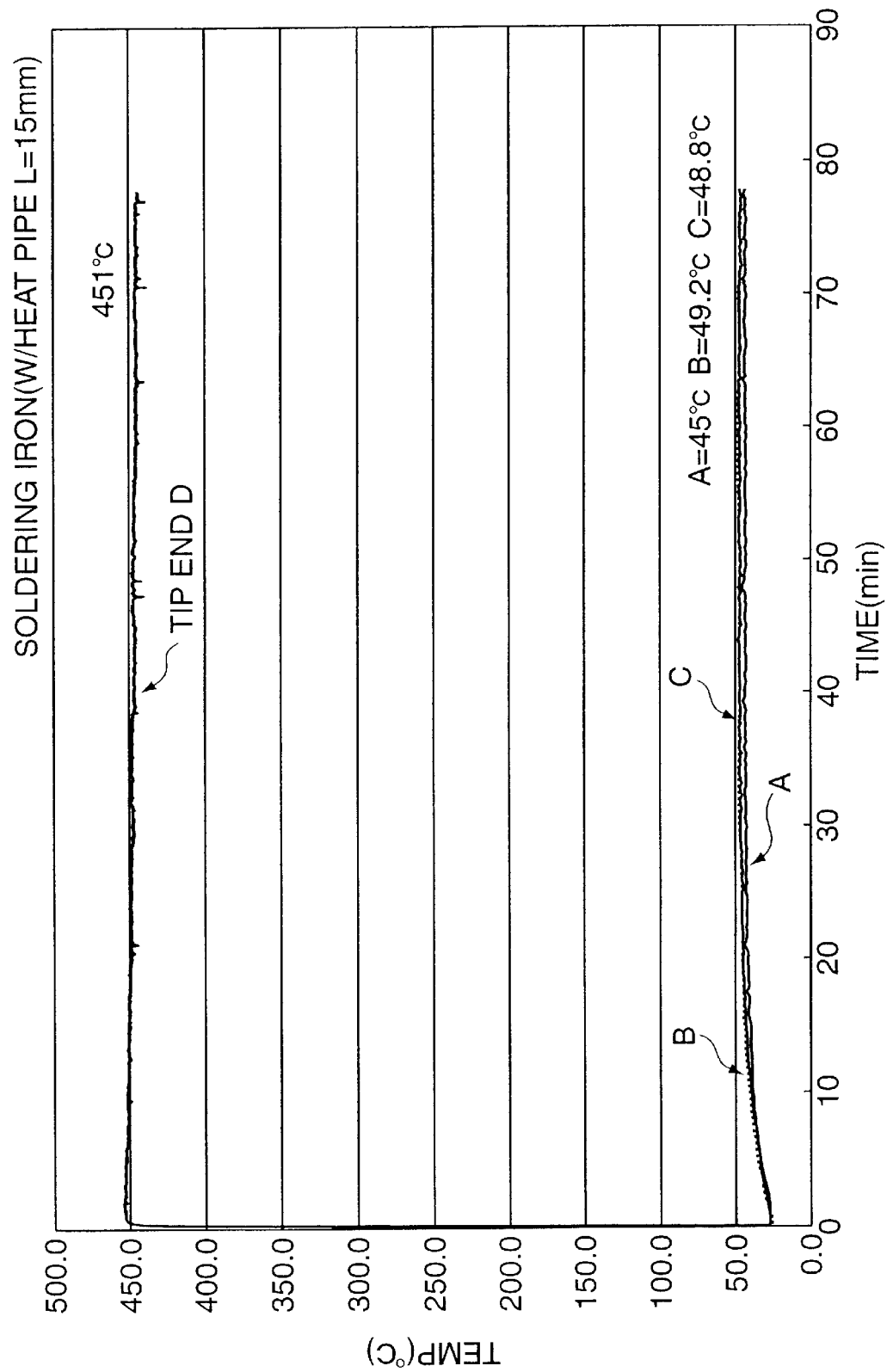

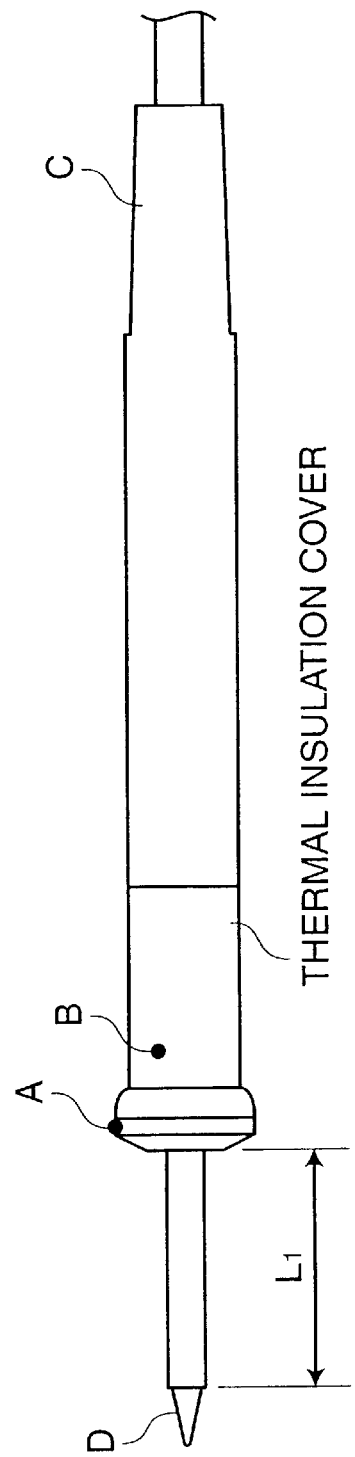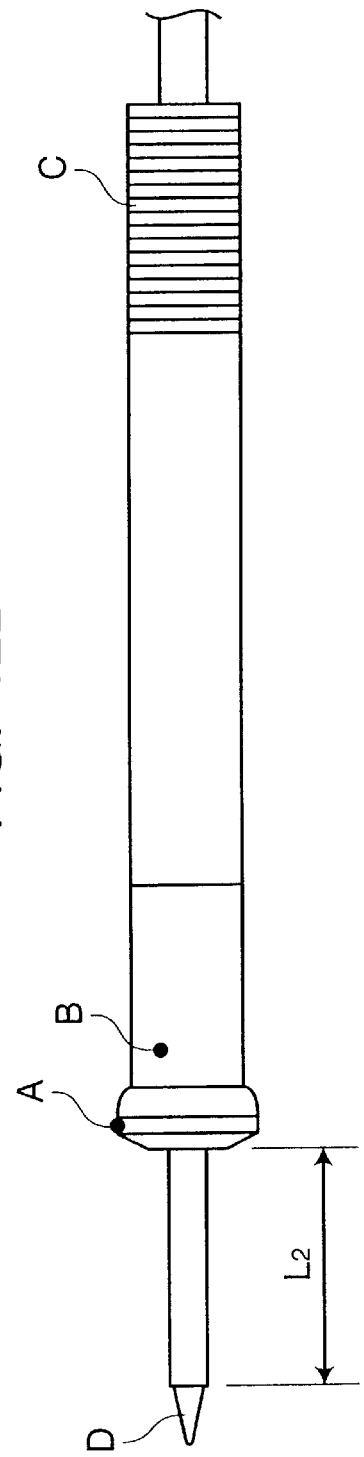

SOLDERING IRON WITH HEAT PIPE

BACKGROUND OF THE INVENTION

1. Field of the Invention

This invention relates to a soldering iron. More specifically this invention relates to a soldering iron including a solder tip and heater electrically heating the tip end.

2. Description of the Related Art

In recent years, sizes of the parts and substrates on which soldering work needs to be performed have been getting smaller and thus the precision work has been on demand for soldering work. As a result, the dimension between the tip end and the grip portion was required to be shorter. However, shortening the dimension between them leads to the situation such that the grip portion of the soldering iron gets easily hot, necessitating to halt the soldering work or to have a user wear a thick grove, which, in turn, makes the precision work highly difficult. Or there is another way to cope with this situation, that is, to mount a thermal insulation type cover around the grip portion; however, doing so necessitates addition to the extra member to the soldering iron, in turn, raising the cost thereof. Moreover, doing so increases the diameter of the grip portion, which, in turn, leads a user to feel less comfort when gripping the grip portion. Thus there has been a demand to control the temperature of the grip portion under the certain level even during the long period of use and to keep the dimension between the grip portion and the tip end short so that the precision work can be performed for a long period of time.

SUMMARY OF THE INVENTION

Thereupon, an object of the present invention is to provide a soldering iron having a relatively short dimension between the tip end and the grip portion and it still can be used for a long period of time without the temperature of the grip portion exceeding the certain level.

In order to achieve the object noted above, according to the present invention, a soldering iron comprises: a tip end; a heater portion for electrically heating the tip end of the soldering iron; a holding portion provided at the rear end of the heater portion including: a heat pipe structure having at least one heat pipe provided in the holding portion; a heat pipe holder for holding the heat pipe to which heat generated at the heater portion is transferred; and a grip portion placed externally around the first heat pipe holder.

With the aforementioned features of the soldering iron, the temperature raise of the grip portion due to the heat transfer from the heater portion is suppressed to the certain level. Thus the dimension between the tip end and the front end of the grip portion can be made shorter than the conventional type soldering iron which uses no heat pipe without raising the temperature of the grip portion beyond the un-tolerable level. Furthermore it enables to shorten the length of the projected amount of the soldering tip, i.e., the dimension between a tip end and the front end of the grip portion, by a certain amount such that the temperature at the grip portion is still maintained at a tolerable level. This leads to the possibility of shortened tip, which in turn reduces the cost for the soldering tip in some degree.

These and other objects and advantages of the present invention will become more apparent upon reading of the following detailed description along with the accompanied drawings.

BRIEF DESCRIPTION OF THE DRAWINGS

FIG. 5A is a diagram showing a sub-assembly structure 50A including a heat pipe 9, a heat receiving member 8, and a separable type heat dissipating member 12A, 12B;

FIG. 5B is a cross sectional view of the sub-assembly structure 50A taken along a plane 5B orthogonal to the longitudinal direction, indicated with a line L, of the assembly structure;

FIGS. 10A through 10D are graphs showing variations of temperature at specific portions of the soldering iron of its conventional type (w/o heat pipe) and the soldering iron with the heat pipe of this invention;

FIG. 10A is a graph showing variation of temperature measured at tip end, a rear end of protection pipe, a plus electrode, and a minus electrode of a soldering iron of the present invention;

FIG. 10B is a graph showing variation of temperature measured at tip end, a nipple portion, a front end of a grip portion, and a heat dissipating member of a soldering iron with a heat pipe of this invention;

FIG. 10C is a graph showing variation of temperature measured at tip end, a rear end of protection pipe, a plus electrode, and a minus electrode of a soldering iron of its conventional type;

FIG. 10D is a graph showing variation of temperature measured at tip end, a nipple portion, a front end of a grip, and a heat dissipate portion of a soldering iron of its conventional type;

FIG. 11B is a graph showing variation of temperatures measured at a point A, a point B, a point C and a point D (shown in FIG. 12B) of a soldering iron of the present invention having a tip end with dimension L2 (=15 mm);

FIG. 12A is an explanatory diagram showing a soldering iron of the conventional type used in the experiment;

FIG. 12B is an explanatory diagram showing a soldering iron of the present invention used in the experiment.

These and other objects, features and advantages of the present invention will become more apparent upon reading the following detailed description along with the accompanied drawings.

DETAILED DESCRIPTION OF INVENTION

Hereinafter, a soldering iron 1 of the present invention is described with reference to the drawings.

Figure 1:
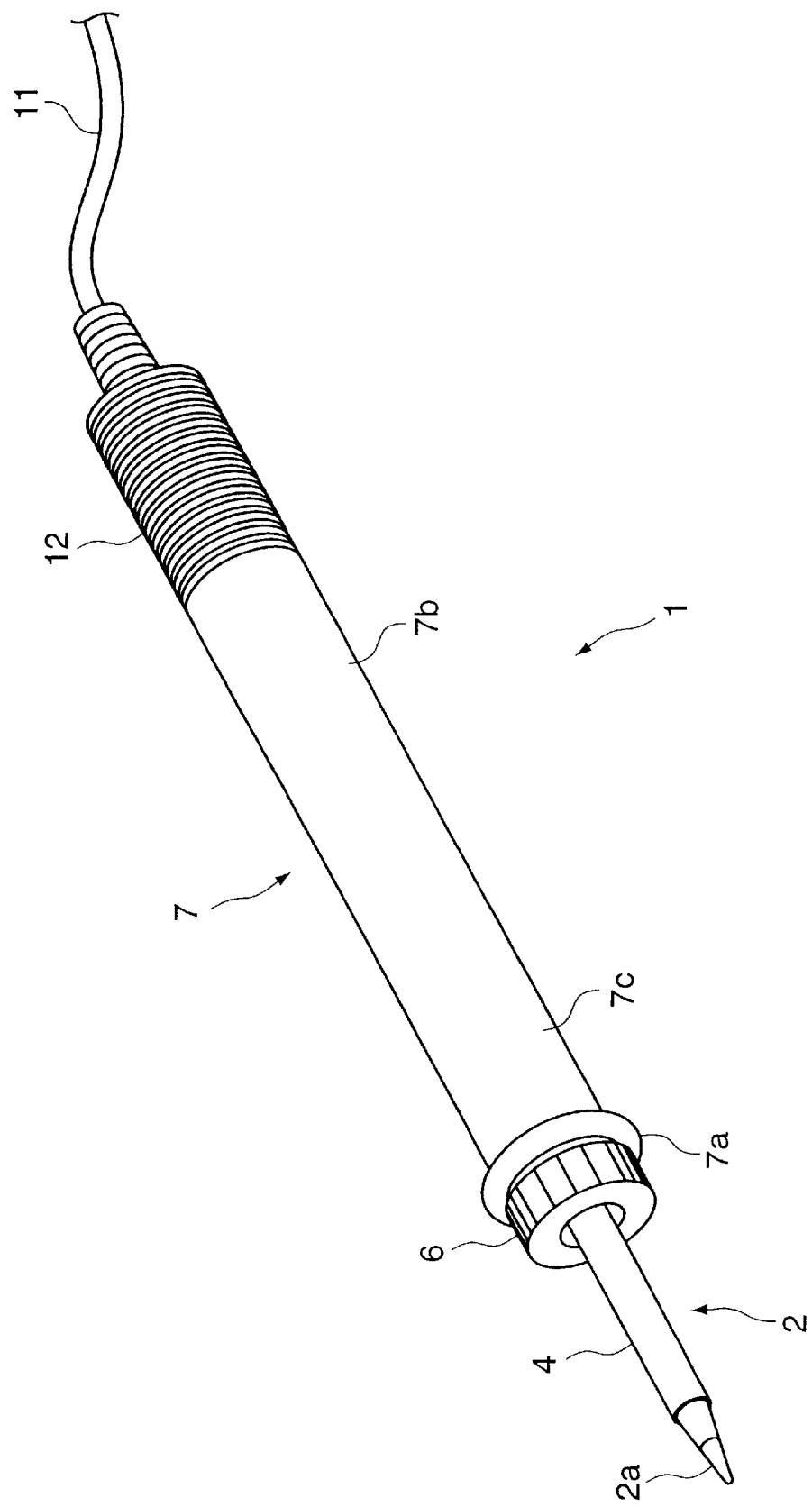
FIG. 1 is a perspective view showing an overall structure of a soldering iron, which equips a heat pipe as one embodiment of the present invention.
Figure 2:
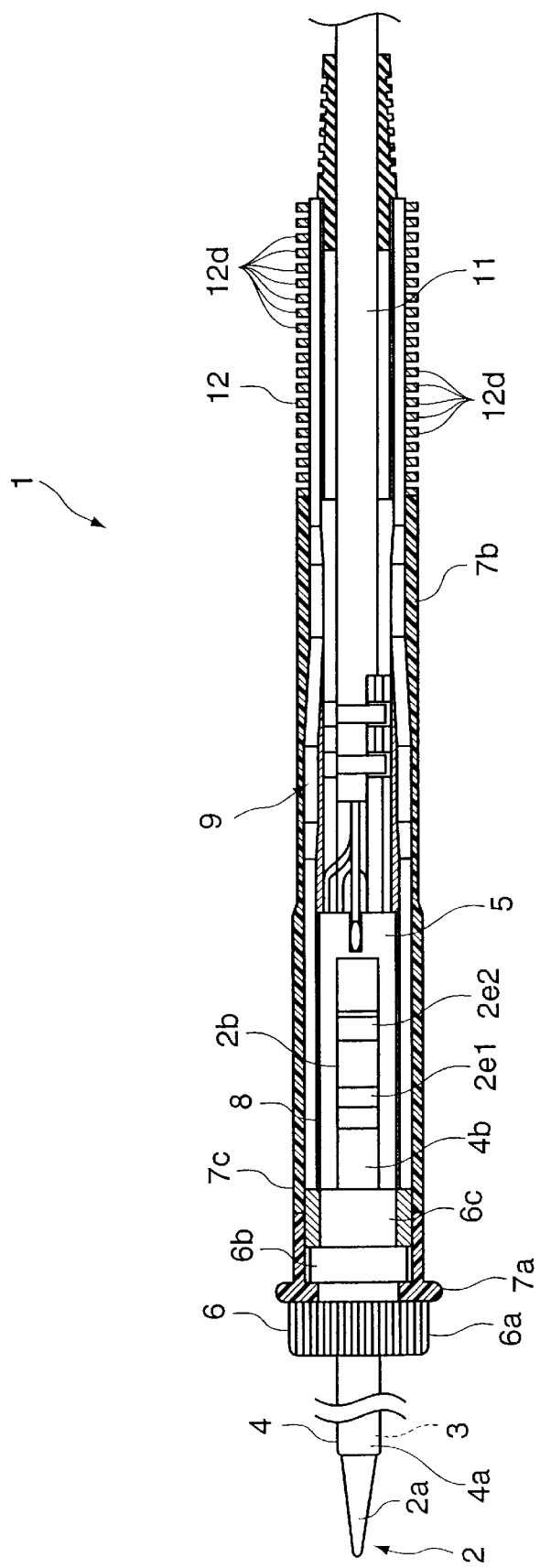
FIG. 2 is a diagram showing an interior structure of the soldering iron shown in FIG. 1.

General description of the structure of a soldering iron as one embodiment:

FIG. 1 is a perspective view showing an overall structure of a soldering iron 1 which equips a heat pipe 9 as one embodiment of the present invention. FIG. 2 is a diagram showing an interior structure of the soldering iron shown in FIG. 1.

The soldering iron 1 is formed with the following parts. A solder tip 2, composed of a tip end 2a and a rear portion 2b extending from the tip end 2a, a heater 3 provided in the solder tip 2, a protection pipe 4 which is in a form of hollow cylinder, extending from a front portion 4a to a rear portion 4b, encasing the medium portion of the solder tip 2 and the heater 3, and a nipple 6 which is securely placed onto the outer circumference of the protection pipe 4 to securely hold the solder tip 2 to a grip member 7. The grip member 7 is divided into three portions, namely, a flange portion 7a, which is in contact with the nipple 6, a body portion 7b, which is a rearward part of the grip member 7, and a grip portion 7c where a user's hand touches when the soldering iron 1 is in use. On the rear end 2b of the solder tip 2, there are provided a minus electrode 2e1 and a plus electrode 2e2 that are internally connected to the heater 3 provided in the protection pipe 4 such that electrical current from an unillustrated power source via an electrical code 11 is supplied to the heater 3 to raise the temperature of the tip end 2a at a level of 450 degrees in Celsius. The rear end 2b of the solder tip 2 is held in a casing 5 which allows the electrical connection between the lead end of electric cables to the minus and plus electrodes 2e1, 2e2 respectively, and the outer circumference of the casing 5 is fit in the inner circumference of a heat receiving member 8 (described in more details below) such that the rear end 2b of the solder tip 2 is securely held in the heat receiving member 8.

In the grip member 7, there is provided a heat pipe structure including a heat pipe 9, the heat receiving member 8 (also referred to as a first heat pipe holder) and a heat dissipating member 12 (also referred to as a second heat pipe holder) such that the heat pipe 9 is securely held between the heat receiving member 8 and the heat dissipating member 12.

Heat is generated in the heater 3 when the power is supplied thereto from the power source (not shown) via the electric code 11. The generated heat in the heater 3 heats the tip end 2a to enable the soldering work and at the same time the generated heat is transferred towards elements that are in contact with the rear end portion of the heater 3, they are, the casing 5, the heat receiving member 8 encasing the casing 15, the grip member 7 encasing the heat receiving member 8, the heat pipe 9, and the heat dissipating member 12.

Accordingly one passage of the heat transfer is established from the rear end 2b of the solder tip 2 to the grip portion 7c where the user with his/her bare hand touches.

On the other hand, another passage of the heat transfer is established between the rear end 2b of the solder tip 2 and the heat dissipating member 12 via the heat receiving member 8 and the heat pipe 9. The mechanism of the heat transfer through the heat pipe 9 is described as follows with reference to FIGS. 4, 5A, 5B, 6A, 6B, and 7.

Figure 4:
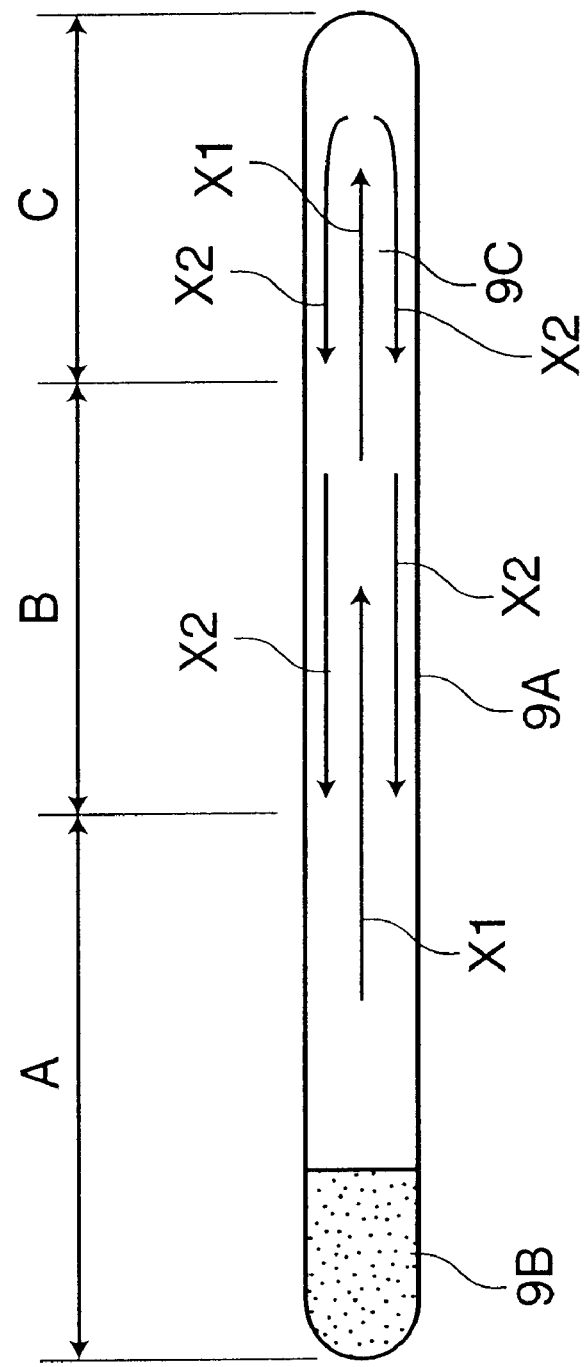
FIG. 4 is an explanatory diagram showing a basic structure of a heat pipe.

The basic structure of the heat pipe 9 is shown in FIG. 4. The heat pipe 9 is basically a sealed vacuum pipe made of cupper (or cupper alloy) with a small amount of pure water 9B included therein readily available in the market in present time. Although the heat pipe 9 shown in FIG. 4 is drawn in a horizontal posture but the heat pipe 9 is used in a non-horizontal manner for the actual soldering work such that one end is usually kept lower in altitude than the other end. As can be seen from FIG. 4 an amount of water is substantially small in comparison to an entire volume of the interior of the heat pipe 9. As mentioned, the area other than the water 9B is kept as a vacuum condition. When the left end portion A (for this example functioning as a heat receiving area A) of the heat pipe 9 where water 9b stays is heated, then in the water 9b, vaporization begins to take place, causing the vapor to move rapidly to a dissipating area C via a heat transferring area B (indicated with an arrow×1). Note that because of the vaporization of water, the water needs to consume a great amount of energy, heat vaporization energy, which eventually facilitates the heat transfer from the heat receiving area A. The vaporized water once reaching the heat dissipating area C, higher in altitude when in use than the heat receiving area A is cooled down assuming the heat dissipating area C is kept at an atmospheric temperature and thus transformed into a liquid phase, i.e., condensation takes place, and then the liquidized water runs down along a inner surface of the heat pipe 9 (indicated with an arrow×2). The water, as mentioned above, changes its phase between a liquid phase and a vapor phase and moves back and forth between the heat receiving area A and the heat dissipating area C in the heat pipe 9 via heat transferring area B. By this repetitive movement of the water in the heat pipe, the heat transferred to the heat receiving area A of the heat pipe 9 is dissipated from the heat dissipating area C so that the great amount of heat dissipation is performed.

Note that the heat pipe 9 can be functioning when it is used in a horizontal posture as long as the one end is kept high in temperature and the other end is kept low in temperature such that the fluid included in the heat pipe 9 can change its phase between liquid phase and vapor phase. Also note that the fluid contained in the heat pipe 9 does not have to be water but other type of cooling fluid can be used.

With the above in mind, the heat pipe 9 is equipped in the soldering iron 1 of this invention as shown in FIGS. 5A through 7B. As shown in these Figs, the heat pipe 9 is held between a heat receiving member 8 and a heat dissipating member 12.

As being clear from FIG. 2, the heat receiving member 8 receives heat generated in the heater 3 via the casing 5. Then the heat received in the heat receiving member 8 is transferred to a front end of the heat pipe 9 and then due to the water 9a included in the heat pipe 9, which vaporizes, the heat is then transferred to the rear end of the heat pipe 9. Sine the rear end of the heat pipe 9 is held in the heat dissipating member 12 which is a much larger mass than the rear end of the heat pipe 9 and is always exposed to an environment with a plurality of radially outwardly projected circular fins 12d. As a result, the rear end of the heat pipe 9 can be maintained relatively cool and when the heat is transferred to the rear end of the heat pipe 9, it is easily cooled down.

Figure 6A:
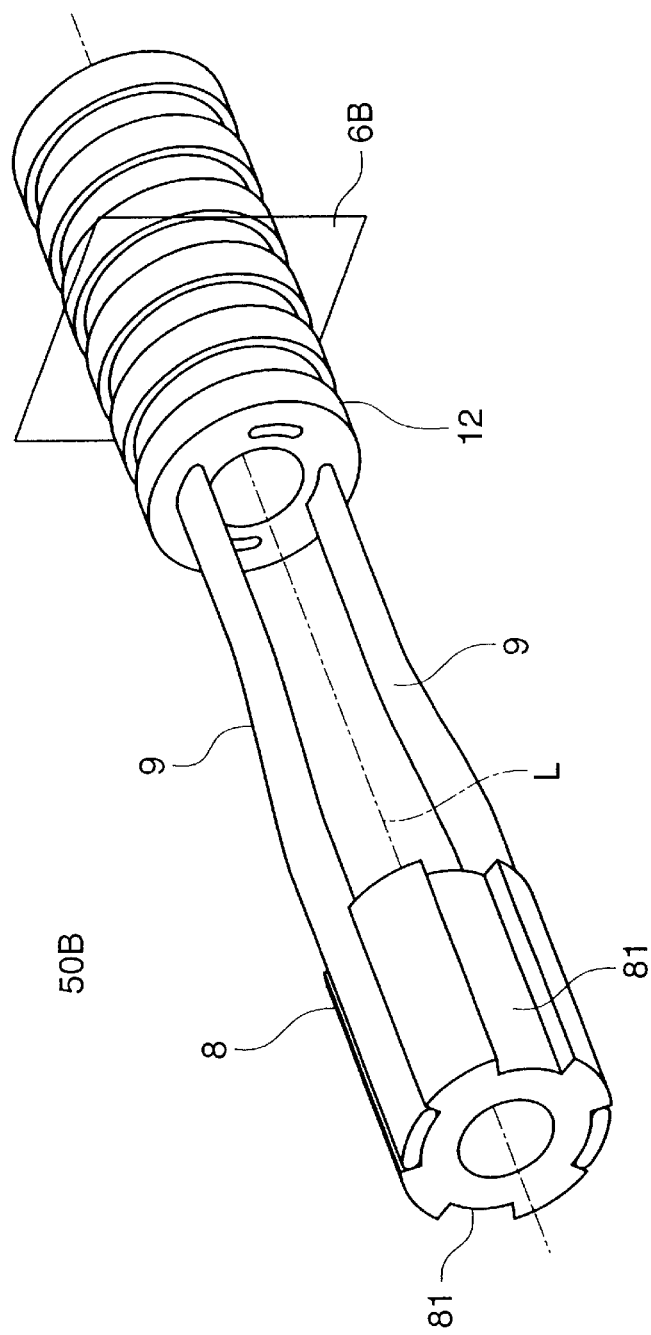
FIG. 6A is a diagram showing a sub-assembly structure 50B including a heat pipe 9, a heat receiving member 8, and a non-separable type heat dissipating member 12.
Figure 6B:
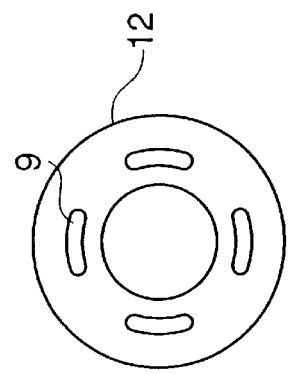
FIG. 6B is a cross sectional view of the sub-assembly structure 50B taken along a plane 6B orthogonal to the longitudinal direction, indicated with a line L, of the assembly structure.
Figure 7A:
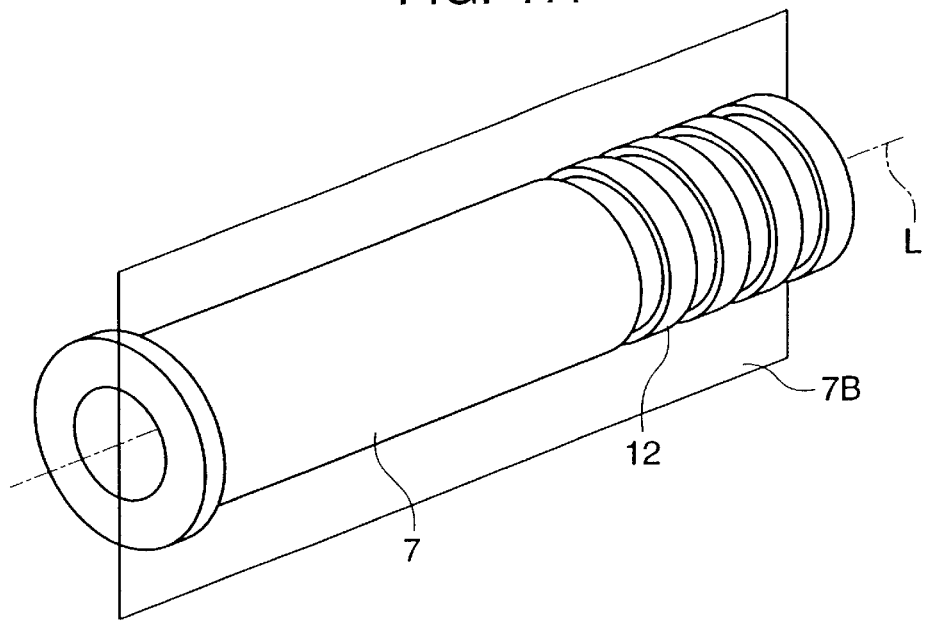
FIG. 7A is a simplified perspective diagram showing a state when the sub-assembly structure shown in FIG. 6 is placed in a grip member.
Figure 7B:
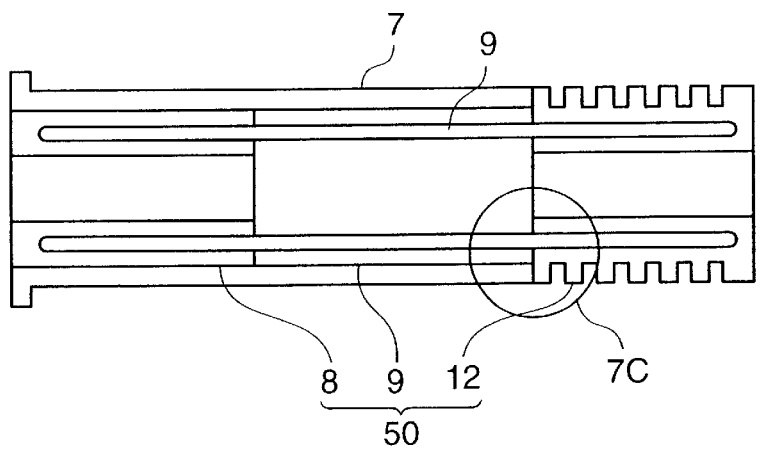
FIG. 7B is a diagram showing a cross sectional view taken along a plane 7B extending longitudinal direction along a line L.
Figure 7C:
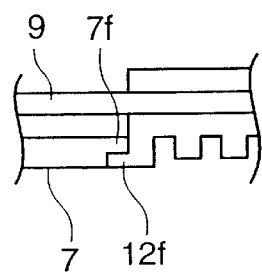
FIG. 7C is a diagram showing a magnification view of the section encircled in FIG. 7B.

FIGS. 7A and 7B are diagrams each showing a grip member 7 encasing the front and middle portions of sub-assembly structure 50 including the heat pipe 9, the heat receiving member 8, and the heat dissipating member 12 as shown in FIG. 5 or FIG. 6. More particularly, the grip member 8 encases the heat receiving member 8 and the heat pipe 9 except the rear portion of the heat pipe 9, which is placed in the heat dissipating member 12. As shown in FIGS. 7B & 7C, the heat dissipating member 12 has an annular projection 12f on its frontal end and the grip member 7 on its rear end surface is provided with an annular projection 7f. Thus the heat dissipating member 12 and the grip member 7 is securely held to each other with the engagement of the annular projection 12f and the annular projection 7f of the grip member 7. The outer surface of the heat dissipating member 12 of its entirety is exposed to an environment.

Furthermore, one example of the material for the heat receiving member 8 and the heat dissipating member 12 is aluminum, but not limited thereto, i.e., could be aluminum alloy, and the material for the heat pipe 9 is cupper, but not limited thereto, i.e., could be copper alloy. Accordingly, heat conductivities of the materials between the contacting portions of the members 8 and 12 are much higher than the heat conductivity between the outer surface of the heat receiving member 8 and the inner surface of the grip member 7 as the grip is molded product and is made of resin. As a result, the greater heat transfer is performed along the path from the heater 3 to the heat dissipating member 12 via the casing 5, the heat receiving member 8, and the heat pipe 9 than the path from the heater 3 to the grip member 7 via the heat receiving member 8.

Structure of Heat Pipe

FIG. 3 shows a preferred structure of the heat pipe 9 used in the soldering iron 1 of this invention. In order to achieve the above described cooling effect via the heat pipe 9, the cylindrical shape heat pipe 9 can be used. However, there usually exists dimensional constrains that necessitate to deform some portions of the heat pipe 9 as shown in FIG. 3. The feature shown in FIG. 3, however, should not be taken as a limitation of the heat pipe used in this invention. Any alternate form can be applied in view of the dimensional constraints of the soldering iron 1. Rather showing the feature in FIG. 3 should be taken as the applicant's intention to disclose the preferable mode. In FIG. 3, the left end and the right end of the heat pipe 9 correspond to a front and a rear of the soldering iron 1.

Figure 3A:
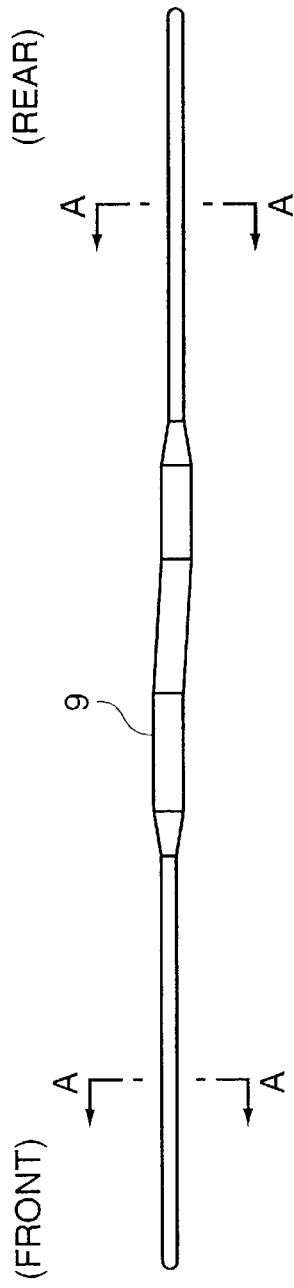
FIGS. 3A, 3B, and 3C are diagrams showing preferable outer configuration of a heat pipe used in the soldering iron shown in FIG. 1.
Figure 3B:
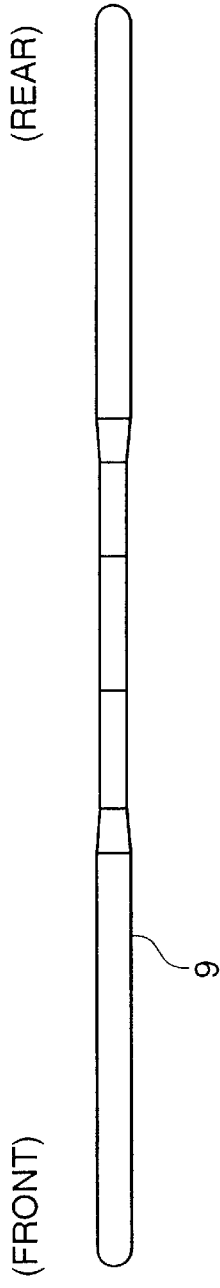
Figure 3C:

FIG. 3A shows a side view of the heat pipe 9 originally having a diameter of 3 mm to 4 mm that was deformed to fit suitably into the sub assembly structure 50A or 50B shown in FIGS. 5 and 6. FIG. 3B is a top view of the heat pipe 9. In addition, FIG. 3C shows two cross sectional views taken along a line A—A in FIG. 3A. Either cross section shown in FIG. 3C is acceptable.

The reason for the above cross section is to place the ends of the heat pipe 9 along the straight grooves 81, 121 formed around the heat receiving member 8 and the heat dissipating member 12. As can be seen from FIG. 5, four straight grooves 121, each is 90 degrees apart from the other, are formed around the circumference of the inner heat dissipating member 12B. Similarly, four straight grooves 81, each is 90 degrees apart from the other, are formed around the circumference of the heat receiving member 8. Note that the heat dissipating member 12 can be in a single form. In this example, however, the heat dissipating member 12 includes an outer cylinder member 12A (or outer heat dissipating member) and an inner cylinder member 12B (or inner heat dissipating member), which is tightly but smoothly placed in the outer cylinder member 12A when in use.

The depth of the straight groove 121 on the inner dissipating member 12B has limit due to the available inner diameter and the outer diameter of the inner heat dissipating member 12B thus the depth needs to be moderately shallow. Accordingly, for the heat pipe 9 to be adequately placed in the groove 121, the heat pipe is allowed to have a circular cross section but it has to be deformed into generally oval shape so that the rear end of the heat pipe fits in the groove 121. Similarly the depth of the straight groove 81 formed on the heat receiving member 8 is limited due to the available inner diameter and the outer diameter thereof. The frontal end of the heat pipe 9, as a result, needs to be deformed to generally oval shape so that the front end of the heat pipe 9 adequately fits in the groove 81.

In addition, the cross section of the rear end of the heat pipe 9 can be adjusted to fit more naturally, as shown in FIG. 5B, an outer circumference of the inner heat dissipating member 12B so that the inner heat dissipating member 12B with the heat pipe 9 can earn more contacting area between the inner circumference of the outer heat dissipating member 12A and the outer circumference of the inner heat dissipating member 12B.

FIGS. 6A and 6B show a sub-assembly structure 50B including a heat pipe 9, a heat receiving member 8, and a non-divisional type heat dissipating member 12. In comparison to the sub-assembly structure 50A, only a heat dissipating member 12 is different such that the heat dissipating member 12 shown in FIGS. 6A, 6B is of non-separable type whereas the heat dissipating member 12 shown in FIGS. 5A, 5B is of separable type. Thus the detailed explanation for the other members is omitted. In the non-separable heat dissipating member 12 is provided with a plurality of through holes 12 (or it could be a blind hole) extending along a longitudinal direction of the soldering iron 1 such that the rear end of the heat pipe 9 can be fit into the hole 12.

Figure 9A:
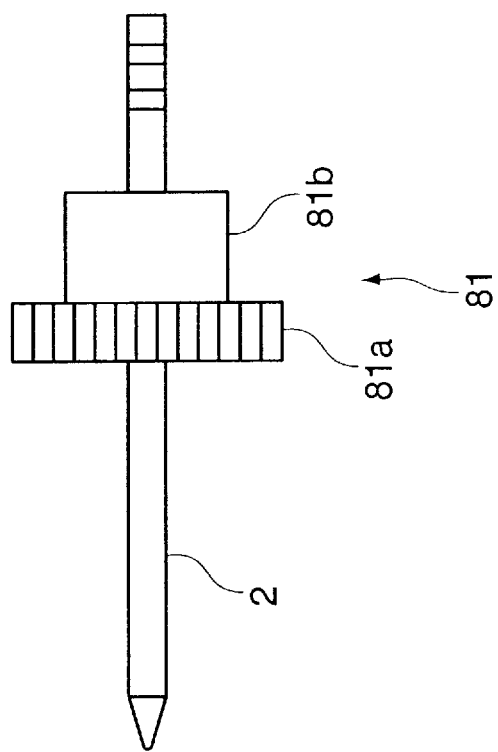
FIGS. 9A and 9B are diagram showing another form of a tip of the soldering iron.
Figure 9B:
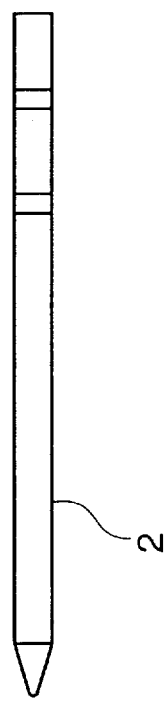

FIGS. 9A and 9b show another form of a solder tip 2 used in the soldering iron 1 of this invention. In FIG. 9A, a flange member 81 is mounted on the solder tip 2 in its middle portion and the rear end 81b of the flange member 81 is designed to be placed tightly in the frontal opening of the heat receiving member 8. In FIG. 9B, the solder tip 2 needs to be placed firmly in the frontal opening of the heat receiving member 8 via an intervening member(s) that connects between the rear end portion of the solder tip 2 and the frontal opening of the heat receiving member 8. Said intervening member could be any member made of the material having a high heat conductivity such as Aluminum that can securely hold the rear end of the tip 2 and keep tight contact with the contacting surface of the frontal opening of the heat receiving member 8.

Effect of the Heat Pipe

In order to quantify the effectiveness of the use of the heat pipe 9 in the soldering iron 1, the following experiments were conducted and the following results were obtained.

The temperature variations were measured at points on the soldering irons; one is a conventional type (without heat pipe) and the other is the type of the present invention (with a heat pipe). The difference between the two soldering irons are in that the present invention utilizes a heat pipe 9 and the conventional type does not use the heat pipe and the remaining structures and dimensions were essentially the same. The projected amount of the solder tip 2 from the frontal face of the nipple portion 6 for both types were adjusted to be 30 mm. Basically there were seven points on the soldering iron 1 whose temperature was measured, namely a tip end (a), a rear end of protection pipe (b), a plus electrode (c), a minus electrode (d), a nipple portion (e), a front portion of a grip member (f), and a dissipating portion (g).

Figure 10B:
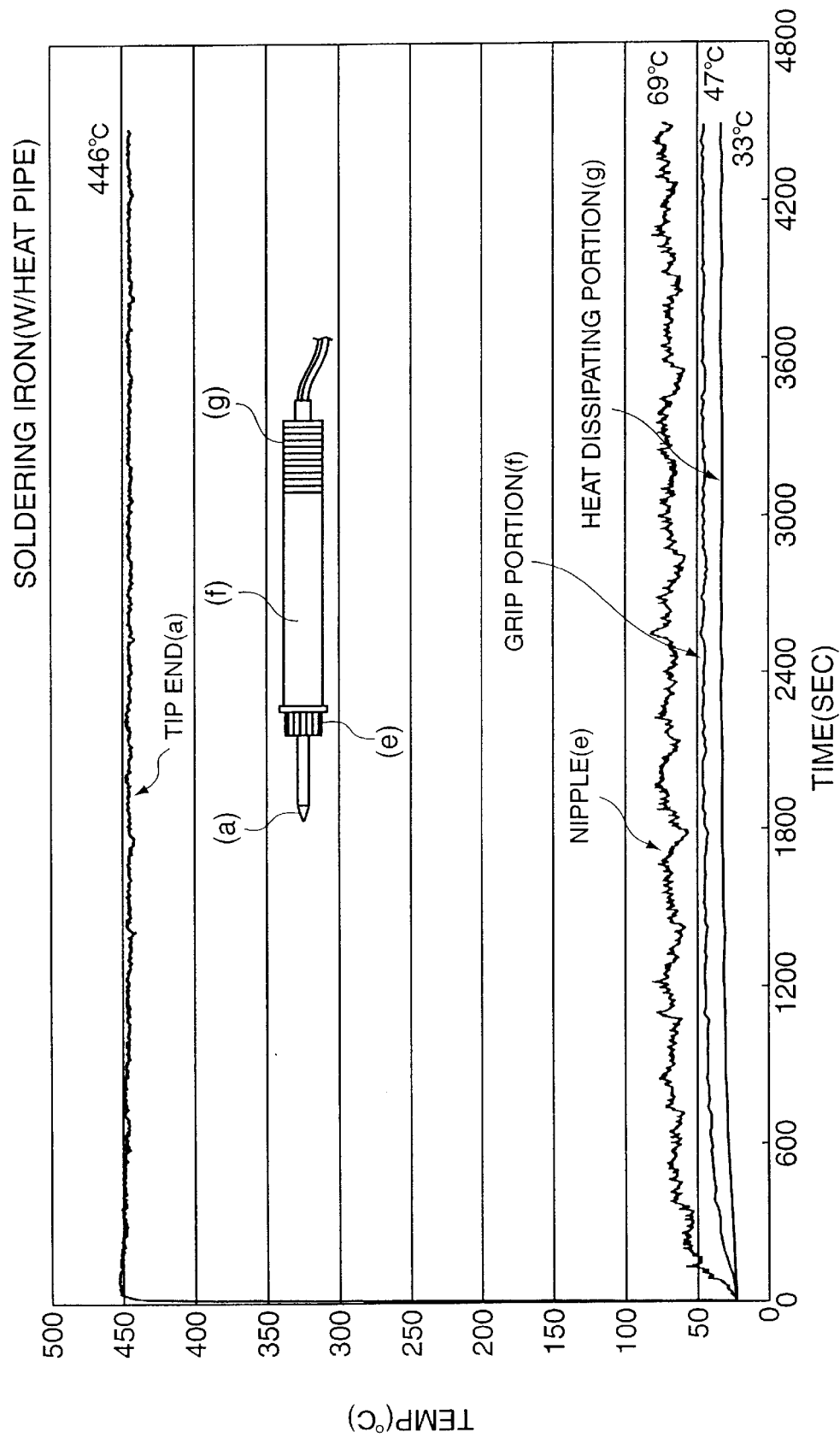

FIG. 10A is a graph showing the experimental result plotting variation of temperatures measured at tip end (a), a rear end of protection pipe (b), a plus electrode (c), and a minus electrode (d) of a soldering iron 1 with a heat pipe. FIG. 10B is a graph showing variation of temperature measured at tip end (a), a nipple portion (e), a front portion of a grip member (f), and a heat dissipate portion (g) of a soldering iron 1 with a heat pipe.

Similarly the temperature variations were measured and plotted at the same points on the soldering iron of its conventional structure (without heat pipe).

FIG. 10C is a graph showing variation of temperature measured at tip end (a), a rear end of protection pipe (b), a plus electrode (c), and a minus electrode (d) of a soldering iron of its conventional type and FIG. 10D is a graph showing variation of temperature measured at tip end (a), a nipple portion (e), a front portion of a grip member (f), and a heat dissipating member (g) of a soldering iron of its conventional type.

As can be seen from FIG. 10B, the temperature at a front portion of grip member (f) of the soldering iron 1 (with heat pipe) is eventually stabilized about 47 degrees (C) after twenty minutes from the time the power supply to the soldering iron 1 begun. Whereas, from FIG. 10D, the temperature at a front portion of grip member (f) of the conventional type soldering iron (without heat pipe) is eventually stabilized at about 56 degrees after twenty minutes from the time the power supply to the soldering iron begun. Accordingly the effect of using the heat pipe 9 became clear so that the present invention (with heat pipe) can suppress the increase of heat on the grip portion 7c by 9 degrees compared to the conventional type soldering iron (without heat pipe).

It may vary from person to person, but generally speaking the user feels very hot in their hand and experiences difficulty holding with their bare hand the grip portion 7c when its temperature exceeds 60 degrees. When the temperature of the grip portion 7c lower than 50 degrees, the user usually experiences no difficulty holding the grip portion 7c with a bare hand. Therefore, the present invention has shown an excellent result in that the grip portion 7c of the soldering iron 1 can be maintained under the tolerable temperature, i.e., lower than 50 degrees, for the user holding the grip portion 7c with a bare hand.

Although the effect of the present invention can be quantified with the above experimental results, further experiment was conducted to show the effect of the present invention in another aspect. We can see that the use of heat pipe can certainly suppress the temperature rise on the grip portion 7c (and other portions as well) of the soldering iron 1; however, another question arose as to how much the projected amount of the tip end 2 can be shortened such that it can still maintain the same level of the temperature on the grip portion as to the conventional soldering iron (without heat pipe). Once we know the minimum projection amount (L-min) of the solder tip 2 such that the temperature on the grip portion 7c is the same level as the conventional type, then we will know the available dimensional range of the projected amount of the solder tip 2 of the soldering iron 1. Then the user has a greater freedom in designing the adequate projected amount of the tip of the soldering iron 1.

To determine said minimum projected amount (L-min), the following experiments were performed. After conducting various experiments with a length (L) of a solder tip 2 as a variable (see FIG. 12B) reducing stepwisely from 30 mm to shorter dimension, the following results were obtained.

Figure 11A:
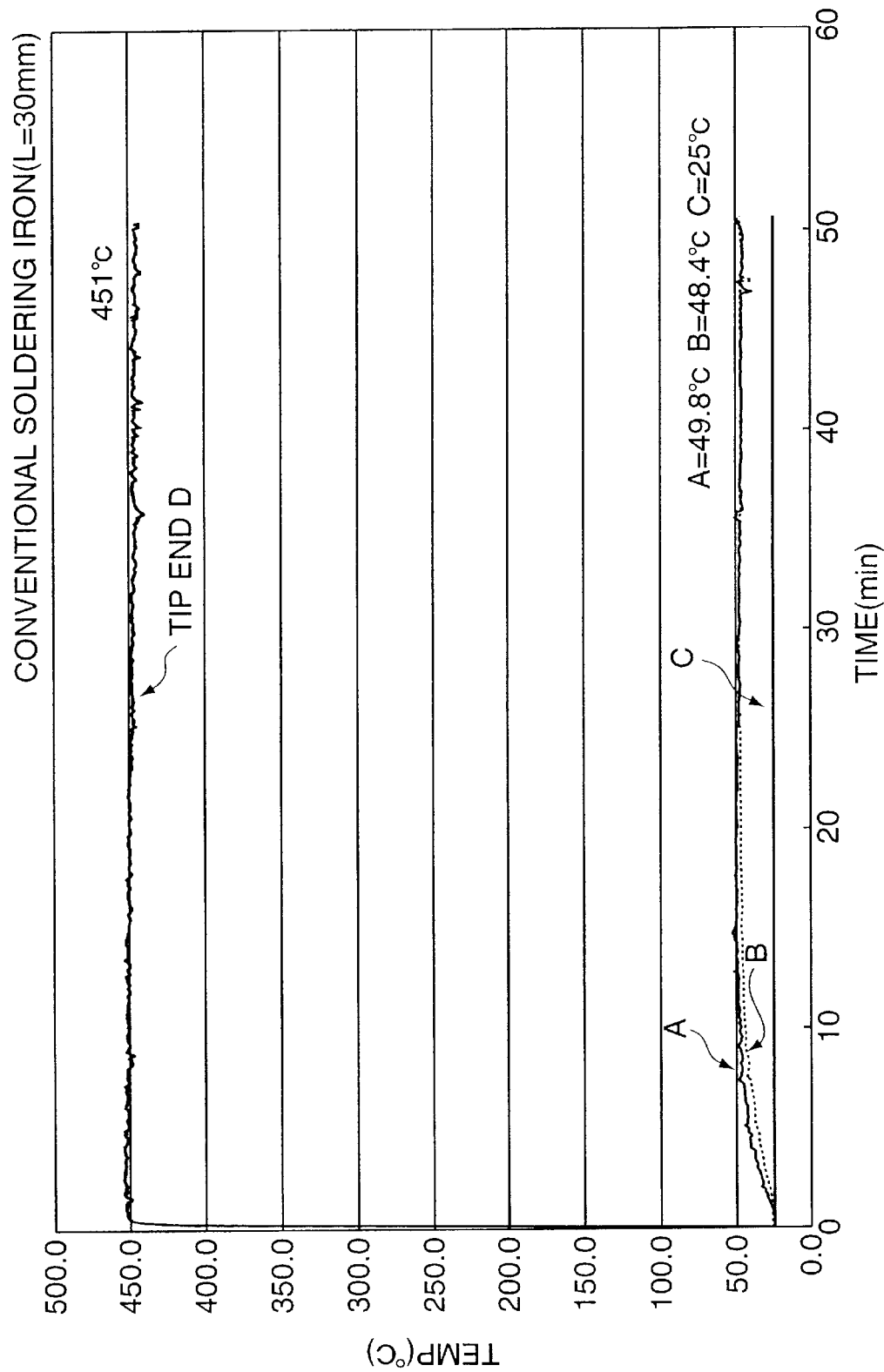
FIG. 11A is a graph showing variation of temperatures measured at a point A, a point B, a point C, and a point D (shown in FIG. 12A) of a soldering iron of its conventional type having a tip end with dimension L1 (=30 mm)

FIG. 11A is a graph showing variation of temperatures measured at a tip end D, a point A, a point B, and a point C (shown in FIG. 12A) of a soldering iron of its conventional type having a tip end with length L 1 (=30 mm) and FIG. 11B is a graph showing variation of temperatures measured at a tip end D, point A, point B, and point C (as shown in FIG. 12B) of a soldering iron 1 with a heat pipe 9 having a tip end with length L2 (=15 mm). Note that in this experiment, a thermal insulation cover is placed around the grip portion of the soldering iron of its conventional type, as shown in FIG. 12A, thus the temperature measure at a point B is presumed to be lower than the temperature at a point B if having been measured without the thermal insulation cover.

As can be seen from comparing the results obtained from FIGS. 11A and 11B, it can be concluded that with the use of the heat pipe 9 structure in the soldering iron 1, the length of tip end of the soldering iron 1 can be shortened from 30 mm to 15 mm to still maintain substantially the same temperature levels at the measurement points. This result also indicates when the length of solder tip 2 is further reduced from 15 mm, then the temperatures at measuring points become higher than the points for the conventional type soldering iron. This result also indicates that the length of the solder tip 2 of the soldering iron 1 with the heat pipe structure employed therein can be adjusted anywhere in a range of 30 mm to 15 mm so that the temperatures at the measured points will not exceed the present level. In other words, once knowing the minimum length of the tip end of the soldering iron 1 with the heat pipe structure that can maintain the permissible temperature levels on the grip portion 7c, it allows a designer to pick any suitable length among the range between the tip end length (i.e., 30 mm) needed for the soldering iron without heat pipe 9 and the minimum length (i.e., 15 mm) needed for the soldering iron 1 with the heat pipe structure. As a result, a suitable length of the solder tip 2 of the soldering iron 1 can be achieved.

Alternate Forms of Invention:

Though two identical heat pipes 9 are used in the soldering iron 1 as described in the above, the number of the heat pipes 9 is not limited thereto. It may be possible to equip three or four heat pipes 9 in the soldering iron 1.

In the above descriptions, the straight groove 121 is formed on the inner heat dissipating member 12B, however, it is also possible to form a through hole (or blind hole) in the inner heat dissipating member 12B such that the rear end of the heat pipe 9 can be accommodated in the through hole. The same can be applied to the heat receiving member 8.

In the above description, the heat dissipating member 12 is composed of two members (inner heat dissipating member 12B and the outer heat dissipating member 12A); however, it is possible to form a single non-separable heat dissipating member 12 with the holes extending along a longitudinal direction thereof for the heat pipes 9 as shown in FIGS. 6A & 6B.

It should be considered as a matter of design choice whether a replaceable tip end 2 is used or not.

Figure 8:
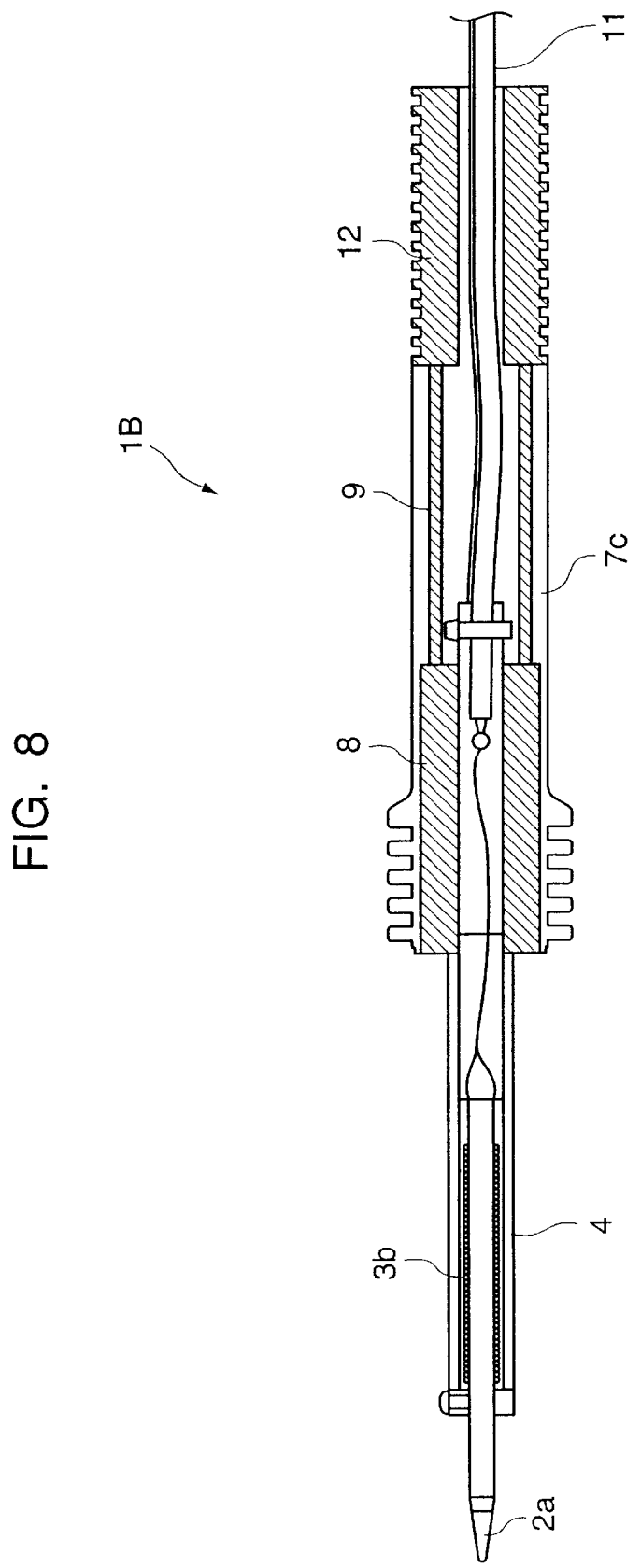
FIG. 8 is a diagram showing a soldering iron of the present invention as another embodiment.

FIG. 8 shows a soldering iron 1B of the present invention as another embodiment. The overall structure is basically similar to the one shown in FIG. 1 thus detailed description for the each part is omitted. In this structure, a nichrome heater 3b is provided in a protection pipe 4 to heat a tip end 2a. Heat generated in the nichrome heater 3b is transferred to a heat dissipating member 12 via a heat receiving member 8 and a heat pipe 9. In addition, the heat is also transferred to a grip portion 7c from the heater 3b through the heat receiving member 8. However, because the heat conductivities of the materials in contact along the main heat transfer passage (heat receiving member 8>heat pipe 9>heat dissipating member 12) is set to be much higher than the heat conductivities of the materials in contact along the sub heat transfer passage (heat receiving member 8>grip portion 7c) as grip member 7 being of a mold resin, a greater proportion of the heat generated in the heater 3b is transferred to the heat dissipating member 12 along the main heat transfer passage such that the substantial amount of generated heat is dissipated from the heat dissipating member 12.

Application of Heat Pipe in Solder Suction Device

Figure 13:
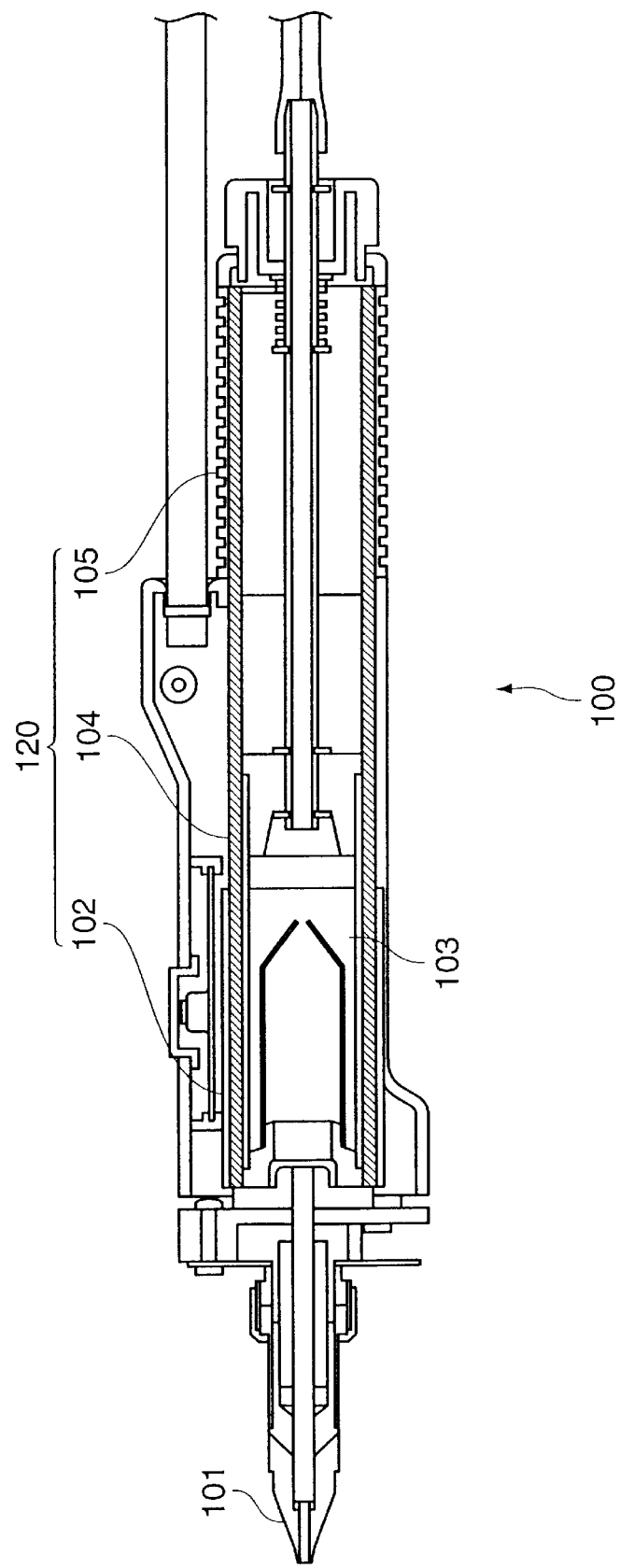
FIG. 13 is a diagram showing a solder suction device using a heat pipe in a manner used in the soldering iron of this invention.

The heat pipe 9 used in the soldering iron 1 can also be applicable in a similar manner to a solder suction device 100 as shown in FIG. 13. The solder suction device 100 includes a suction nozzle 101, a heat receiving section 102, a heat pipe 104, a filter 103, and a heat dissipating section 105. Similar to the soldering iron 1 described in the above passages, the heat pipe 104 is held between the heat receiving section 102 and the heat dissipating section 105. The heat pipe 104 basically functions as the heat pipe 9 used in the aforementioned soldering iron 1. Because of the heat pipe sub assembly structure 120 (including members 102, 104 and 105) equipped in the solder suction device 100, the heat generated from the suction nozzle 101 and inside of the filter 103 can be cooled down.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A soldering iron comprising:
   a tip end;
   a heater portion for electrically heating the tip end of the soldering iron;
   a holding portion provided at the rear end of the heater portion, said holding portion including a grip area where a user's hand grips on when the soldering iron is in use:
      a heat pipe structure provided in the holding portion, said heat pipe structure includes a sealed heat pipe having a chamber including a fluid therein;
      a first heat pipe holder for holding a front end of the heat pipe structure to which heat generated at the heater portion is transferred; and
      a second heat pipe holder for holding a rear end of the heat pipe structure;
      wherein the heat pipe structure includes a plurality of sealed heat pipes, each of which contains water therein and the contained water can be movable within the heat pipe.

2. A soldering iron comprising:
   a tip end;
   a heater portion for electrically heating the tip end of the soldering iron;
   a holding portion provided at the rear end of the heater portion, said holding portion including a grip area where a user's hand grips on when the soldering iron is in use:
   a heat pipe structure provided in the holding portion, said heat pipe structure includes a sealed heat pipe having a chamber including a fluid therein;
   a first heat pipe holder for holding a front end of the heat pipe structure to which heat generated at the heater portion is transferred; and
   a second heat pipe holder for holding a rear end of the heat pipe structure;
   wherein the heat pipe structure includes two sealed heat pipes, each of which includes water therein and the contained water can be movable within the heat pipe.

3. The soldering iron according to claim 2, wherein the two sealed heat pipes are identical.

4. The soldering iron according to claim 1, wherein each of the sealed heat pipes extends along a longitudinal axis of the soldering iron.

5. A soldering iron comprising:
   a tip end;
   a heater portion for electrically heating the tip end of the soldering iron;
   a holding portion provided at the rear end of the heater portion, said holding portion including a grip area where a user's hand grips on when the soldering iron is in use:
   a heat pipe structure provided in the holding portion, said heat pipe structure includes a sealed heat pipe having a chamber including a fluid therein;
   a first heat pipe holder for holding a front end of the heat pipe structure to which heat generated at the heater portion is transferred; and
   a second heat pipe holder for holding a rear end of the heat pipe structure;
   wherein said first heat pipe holder is generally a hollow cylinder having an outer surface formed with a plurality of straight grooves extending along the longitudinal direction each of which has a dimension to accommodate the front end of the sealed heat pipe.

6. The soldering iron according to claim 5, wherein the front end of the sealed heat pipe is accommodated in one of the grooves formed on the outer surface of the first heat pipe holder such that a cross section of the first heat pipe holder with the front part of sealed heat pipes accommodated therein is generally a circular.

7. A soldering iron comprising:
   a tip end;
   a heater portion for electrically heating the tip end of the soldering iron;
   a holding portion provided at the rear end of the heater portion, said holding portion including a grip area where a user's hand grips on when the soldering iron is in use:
   a heat pipe structure provided in the holding portion, said heat pipe structure includes a sealed heat pipe having a chamber including a fluid therein;
   a first heat pipe holder for holding a front end of the heat pipe structure to which heat generated at the heater portion is transferred; and
   a second heat pipe holder for holding a rear end of the heat pipe structure;
   wherein said second heat pipe holder is generally of a hollow cylinder formed with a plurality of straight holes extending along the longitudinal direction of the soldering iron each of which has a dimension to accommodate the rear end of the sealed heat pipe therein.

8. The soldering iron according to claim 7, wherein the outer circumference of the second heat pipe holder is provided with a plurality of radially outwardly extending circular projections such that said projections function as heat dissipating members.

9. A soldering iron comprising:
a tip end;
a heater portion for electrically heating the tip end of the soldering iron;
a holding portion provided at the rear end of the heater portion, said holding portion including a grip area where a user's hand grips on when the soldering iron is in use:
a heat pipe structure provided in the holding portion, said heat pipe structure includes a sealed heat pipe having a chamber including a fluid therein;
a first heat pipe holder for holding a front end of the heat pipe structure to which heat generated at the heater K portion is transferred; and
a second heat pipe holder for holding a rear end of the heat pipe structure;
wherein the first heat pipe holder is placed in the holding portion and the position of the grip area of the holding portion along a longitudinal direction of the soldering iron substantially corresponds to the area of the first heat pipe holder along the longitudinal direction of the soldering iron; and
wherein the sealed heat pipe is made of copper or copper alloy.

10. The soldering iron according to claim 9, wherein both of the first and the second heat pipe holders are made of aluminum or aluminum alloy.

11. A soldering iron comprising:
a tip end;
a heater portion for electrically heating the tip end of the soldering iron;
a holding portion provided at the rear end of the heater portion, said holding portion including a grip area where a use's hand grips on when the soldering iron is in use;
a heat pipe structure provided in the holding portion including a plurality of sealed heat pipes, each of which contains a fluid therein and the contained fluid can be movable within the heat pipe, and said each of the heat pipes originally has a circular cross section and has an oval shape in cross section when the heat pipe is placed in the holding portion;
a first heat pipe holder for holding a front end of the heat pipe structure to which heat generated at the heater portion is transferred; and
a second heat pipe holder for holding a rear end of the heat pipe structure.

12. The soldering iron according to claim 11, further comprising a heat dissipation part mounted externally around the second heat pipe holder such that the heat transferred to the second heat pipe holder from the heater portion via the heat pipe structure is dissipated through the dissipation part.

13. The soldering iron according to claim 11, wherein the heat pipe structure includes two sealed heat pipes, each of which includes water therein and the contained water can be movable within the heat pipe.

14. The soldering iron according to claim 11, wherein each of the sealed heat pipes extends along a longitudinal axis of the soldering iron.

15. A soldering iron comprising:
a tip end;
a heater portion for electrically heating the tip end of the soldering iron;
a holding portion provided at the rear end of the heater portion including:
a heat pipe structure having at least one heat pipe provided in the holding portion, said heat pipe structure includes a sealed heat pipe having a chamber including a fluid therein;
a first heat pipe holder for holding the front end of the heat pipe to which heat generated at the heater portion is transferred;
a grip portion placed externally around the first heat pipe holder; and
a second heat pipe holder, provided at the rear end of said holding portion, for holding the rear end of the sealed heat pipe structure;
wherein said first heat pipe holder is generally of a hollow cylinder having an outer surface formed with a plurality of straight grooves extending along the longitudinal direction each of which has a dimension to accommodate the front end of the sealed heat pipe.

16. The soldering iron according to claim 15, wherein the front end of the sealed heat pipe is accommodated in one of the grooves formed on the outer surface of the first heat pipe holder such that a cross section of the first heat pipe holder with the front part of sealed heat pipes accommodated therein is generally a circular.

17. The soldering iron according to claim 11, wherein the outer circumference of the second heat pipe holder is provided with a plurality of radially outwardly extending circular projections such that said projections function as heat dissipating members.

18. A soldering iron comprising:
a tip end;
a heater portion for electrically heating the tip end of the soldering iron;
a holding portion provided at the rear end of the heater portion including:
a heat pipe structure having at least one heat pipe provided in the holding portion, said heat pipe structure includes a sealed heat pipe having a chamber including a fluid therein;
a first heat pipe holder for holding the front end of the heat pipe to which heat generated at the heater portion is transferred;
a grip portion placed externally around the first heat pipe holder; and
a second heat pipe holder, provided at the rear end of said holding portion, for holding the rear end of the sealed heat pipe structure;
wherein the sealed heat pipe is made of copper or copper alloy.

19. A soldering iron comprising:
a tip end;
a heater portion for electrically heating the tip end of the soldering iron;
a holding portion provided at the rear end of the heater portion including:
a heat pipe structure having at least one heat pipe provided in the holding portion, said heat pipe structure includes a sealed heat pipe having a chamber including a fluid therein;
a first heat pipe holder for holding the front end of the heat pipe to which heat generated at the heater portion is transferred;
a grip portion placed externally around the first heat pipe holder; and
a second heat pipe holder, provided at the rear end of said holding portion, for holding the rear end of the sealed heat pipe structure;
wherein both of the first and the second heat pipe holders are made of aluminum or aluminum alloy.

* * * * *